United States Patent [19]
Ernisse et al.

[11] 3,714,873
[45] Feb. 6, 1973

[54] SHUTTER CONTROL APPARATUS FOR PHOTOGRAPHIC CAMERAS

[75] Inventors: Paul J. Ernisse; Robert L. Reynolds, both of Rochester, N.Y.

[73] Assignee: Eastman Kodak Company, Rochester, N.Y.

[22] Filed: Jan. 24, 1972

[21] Appl. No.: 220,395

Related U.S. Application Data

[63] Continuation of Ser. No. 127,475, March 24, 1971.

[52] U.S. Cl..................95/10 CT, 95/53 EB, 95/59
[51] Int. Cl..............95 60, G03b 7/08, G03b 9/62
[58] Field of Search .95/10 C, 10 CE, 10 CT, 11.5 R, 95/53 R, 53 EA, 53 EB, 55, 58, 59, 60

[56] References Cited

UNITED STATES PATENTS

| | | | |
|---|---|---|---|
| 3,307,107 | 2/1967 | Kagan | 95/11.5 R X |
| 3,472,137 | 10/1969 | Galbraith, Jr. | 95/10 CT |
| 3,476,031 | 11/1969 | Starp | 95/53 EB X |
| 3,487,758 | 1/1970 | Rigolini et al. | 95/11.5 R X |
| 3,535,989 | 10/1970 | Kitai | 95/11.5 R X |

*Primary Examiner*—Joseph F. Peters, Jr.
*Attorney*—W. H. J. Kline et al.

[57] ABSTRACT

In a camera having a photoelectric timing circuit for determining shutter speed in accordance with the level of scene illumination, a shutter mechanism including a mechanical override control is provided for establishing a maximum predetermined shutter speed for flash exposures. The shutter mechanism includes an opening blade actuatable to initiate an exposure interval and a closing blade actuatable under the control of the timing circuit to terminate the exposure interval, and the override control includes a member actuatable to permit the opening shutter blade to close after a predetermined time. The override control member is adapted for actuation in response to insertion of a flashlamp unit into a recepticle on the camera and/or in response to actuation of a member accessible from the exterior of the camera.

18 Claims, 5 Drawing Figures

PATENTED FEB 6 1973 3,714,873

PAUL J. ERNISSE
ROBERT L. REYNOLDS
INVENTORS

BY *James A. Smith*
*W. H. J. Kline*
ATTORNEYS

PAUL J. ERNISSE
ROBERT L. REYNOLDS
INVENTORS

BY James A. Smith
W. H. J. Kline
ATTORNEYS

SHUTTER CONTROL APPARATUS FOR PHOTOGRAPHIC CAMERAS

This application is a continuation, of application Ser. No. 127,475 filed March 24, 1971.

CROSS-REFERENCE TO RELATED APPLICATION

Reference is made herein to commonly assigned, copending U.S. Pat. application, Ser. No. 127,475 filed in the names of Paul J. Ernisse and Arnold Ettinger on even date herewith.

BACKGROUND OF THE INVENTION

1. Field of the Invention

This invention relates to automatic shutter controls for cameras and more particularly to such shutter controls that include light-integrating timing circuits.

2. Description of the Prior Art

Many camera shutter mechanisms are presently known which automatically establish the duration of an exposure interval as a function of the illumination received from a scene being photographed. Such control devices usually include additional means to adapt the system for flash exposures due to the relatively slow response time of the photocell in the timing circuit. Typically, such systems are adapted for flash exposures by switching a fixed resistor into the timing circuit in place of the photocell to establish a constant predetermined shutter speed.

Such systems require sufficient battery power to actuate the timing circuit and the flashlamp, simultaneously. In the event of insufficient battery power in such cameras, the shutter operates at its fastest speed, for example 1/250 second, which will result in under exposure in most situations. To enable such shutter systems to operate without battery power at a predetermined speed suitable for use in typical daylight conditions, a mechanical speed control has been provided to disable the timing circuit and to mechanically establish a predetermined shutter speed when a control member is actuated, for example in response to insertion of a flash unit in a socket on the camera as disclosed in commonly assigned, copending U.S. Pat. application Ser. No. (Docket 31,488), filed in the names of Paul J. Ernisse and Robert L. Reynolds on even date herewith. Although the apparatus disclosed in that application is satisfactory, it accomplishes the desired result by means of a relatively complex structure including numerous moving parts which increases manufacturing costs and the incidence of operational failures.

SUMMARY OF THE INVENTION

It is therefore an object of this invention to provide an improved shutter control of the type including a light-integrating timing circuit.

It is another object of this invention to provide such an improved shutter control with mechanical means for establishing a predetermined exposure time suitable for operation with photoflash apparatus.

Still another object of this invention is to provide such an improved photoelectric shutter control including selectively actuatable mechanical means for establishing a predetermined shutter speed suitable for exposure in most daylight conditions or for photoflash exposures.

These and other objects are accomplished according to this invention by a shutter control apparatus for a camera including an opening blade actuatable to initiate exposure and a closing blade actuatable under the control of a timing circuit to terminate the exposure interval, and a mechanical control selectively actuatable to establish a predetermined shutter speed, preferably in response to insertion of a flashlamp unit in a receptacle on the camera, or actuation of a control member accessible from the exterior of the camera.

In one illustrative embodiment of the invention, the opening blade is biased toward a closed position covering the exposure aperture and is actuatable by an impact driver to move the blade against its bias to an open position in which it is retained by a latch means adapted to be disabled in response to insertion of a flashlamp unit to enable the opening blade to return to its closed position terminating the exposure after a predetermined time.

BRIEF DESCRIPTION OF THE DRAWING

In the detailed description of the preferred embodiment of the invention presented herein, reference is made to the accompanying drawings in which.

DESCRIPTION OF THE PREFERRED EMBODIMENT

Because cameras are well known, the present description will be directed in particular to elements forming part of or cooperating more directly with the present invention. The camera elements not specifically shown or described may take various forms well known to those skilled in the art.

Figure 1:
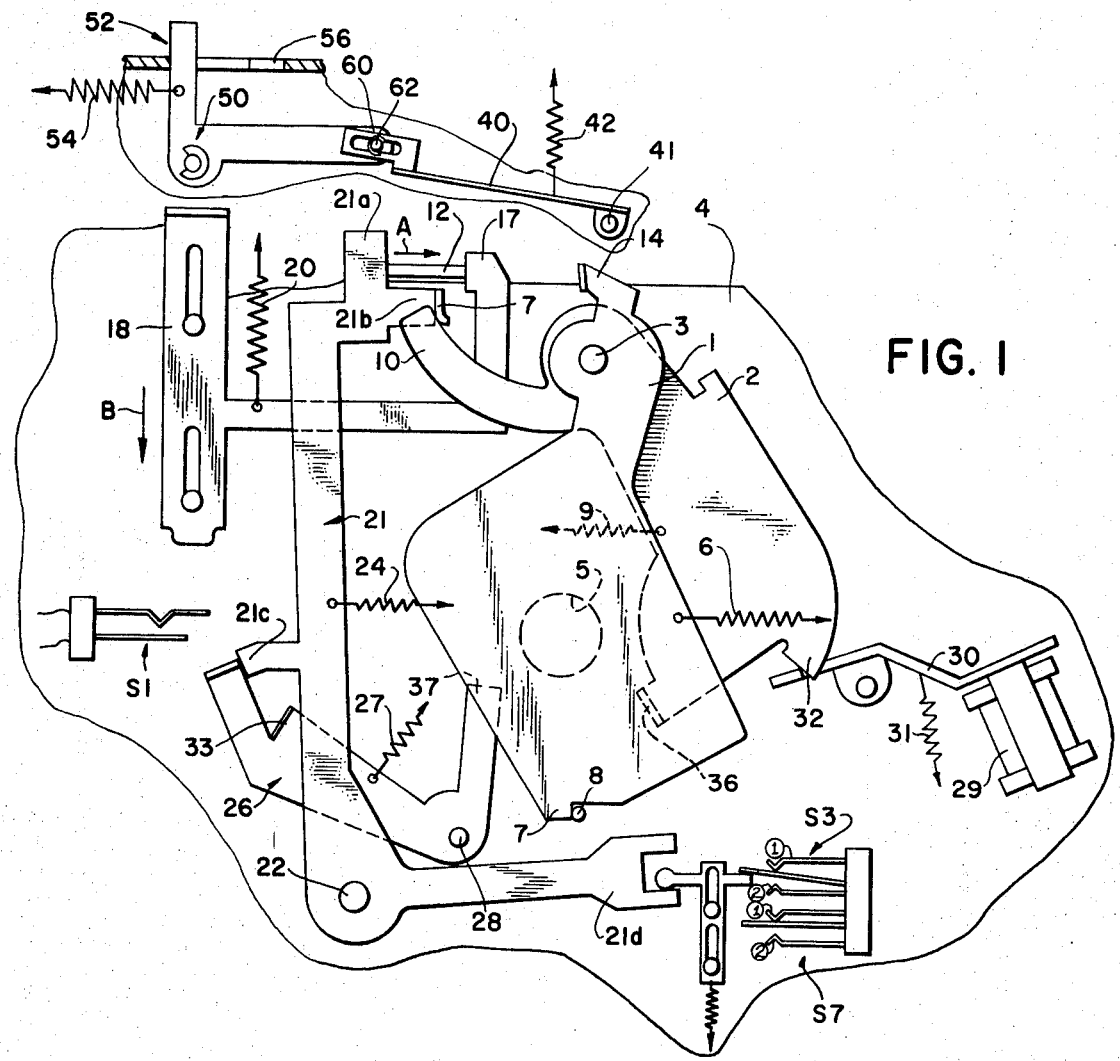
FIG. 1 is an elevational view of a shutter control mechanism according to the invention in its cocked condition.
Figure 2:
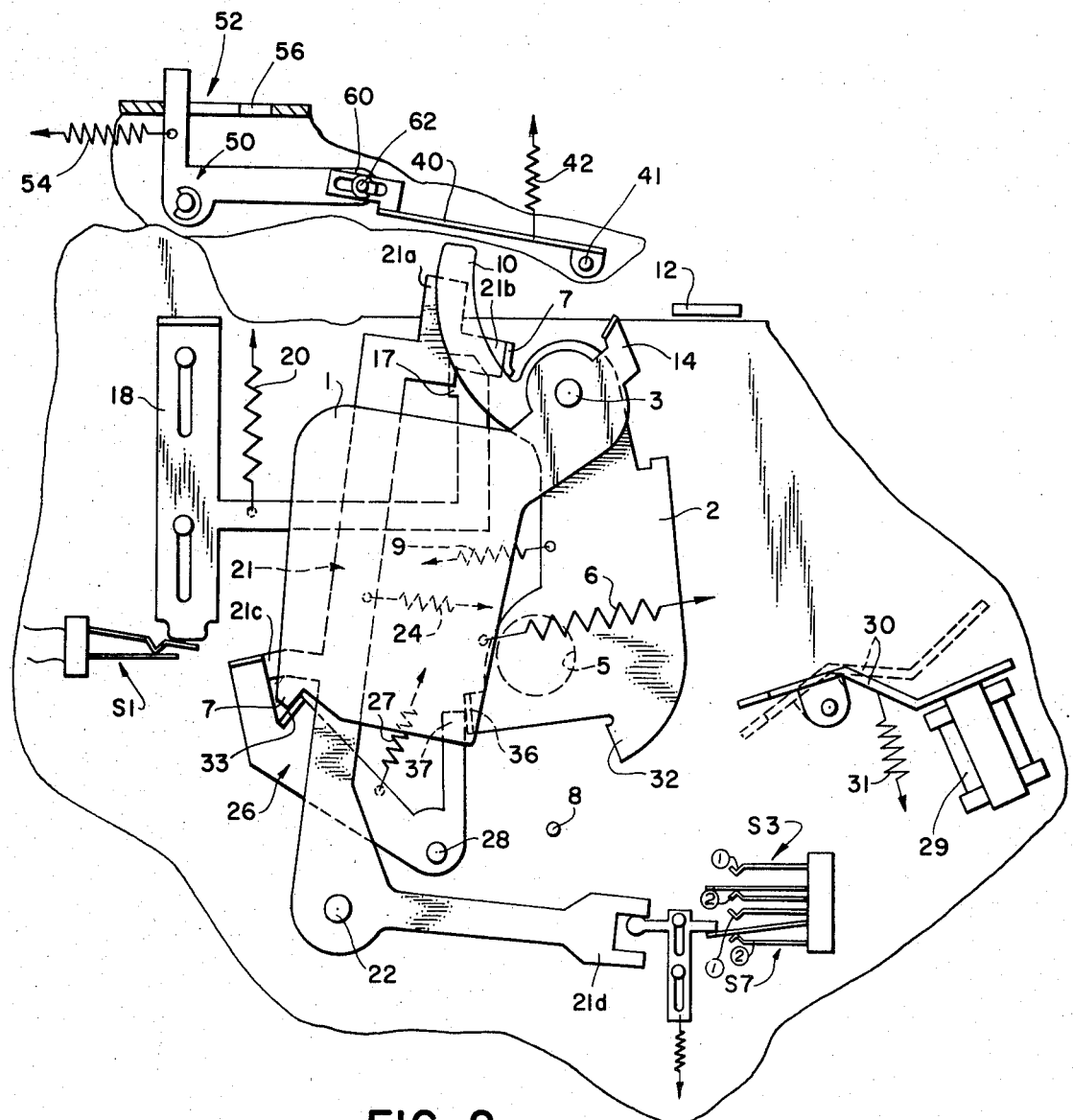
FIG. 2 is an elevational view of the shutter control mechanism of FIG. 1, shown immediately after an exposure interval in ambient conditions.

Referring to FIGS. 1 and 2 there is shown a shutter mechanism according to the invention including an opening blade 1 and a closing blade 2, each of which is pivotally mounted on a pin 3 attached to a camera support plate 4. The blades 1 and 2 are mounted for movement into, and out of, covering positions with respect to an exposure aperture 5, to thereby control passage of incident scene illumination through the exposure aperture 5. In the cocked condition shown in FIG. 1, the opening shutter blade 1 is biased by a spring 6 into engagement with a stop member 8 which holds the blade in a position covering the exposure aperture 5, and a cam surface 7 on the closing blade 2 engages a cam follower 10, retaining the blade 2 in a position uncovering the exposure aperture 5, against the bias of a spring 9.

To actuate the shutter mechanism a shutter driver 12 is provided which is biased in the direction of arrow A toward engagement with a projection 14 on the opening blade 1. The shutter driver 12 is retained against its bias in the cocked position shown in FIG. 1 by engagement with a projection 17 on a release lever 18. The release lever 18 is slidably mounted on the camera support plate 4 with a portion thereof accessible from the exterior of the camera for manual actuation, and it is biased by a spring 20 towards its upper position as shown in FIG. 1. Associated with the release lever 18 is a normally open switch S1, positioned to be engaged and closed by the lever 18 when it is depressed.

The mode of operation of the shutter mechanism may be controlled for exposure in ambient or artificial illumination, by means of a control lever 21 mounted for pivotal movement on a pin 22 secured on the support plate 4. The control lever 21 is functionally connected to both the opening blade 1 and the closing blade 2, and as will be seen from the following discussion, the position of the control lever 21, after initiation of the exposure interval, determines whether the opening blade 1 is retained in an aperture uncovering position during the timed interval, or returned to the aperture covering position in a predetermined time, thereby determining if the mechanism operates in an electronically timed mode or at a fixed mechanical shutter speed.

In the mode of operation for ambient exposure, as shown in FIG. 1, the control lever 21 is retained in the cocked position against the bias of a spring 24 by a projection 21a on the control lever 21 in engagement with the shutter driver 12 when the shutter driver 12 is in its cocked position. In the cocked position of FIG. 1, an extension 21b on the control lever 21 locates the cam follower 7 in a position to engage the cam surface 10 on the closing blade 2 to retain the closing blade 2 in an aperture uncovering position. A finger 21c on the control lever 21 is associated with a latch 26, which latch 26 is pivotally mounted on pin 28, on the support plate 4, and is biased toward engagement with the finger 21c by a spring 27. The latch 26 has a notch 33 positioned to engage and retain the opening blade 1 when it has moved to its open position uncovering the exposure aperture 5. However, in the cocked position the finger 21c engages the latch 26 and rotates it counterclockwise away from its latching position, as shown in FIG. 1. Also, a bifurcated end 21d of the control lever 21 is positioned to control switches S3 and S7, which are adapted for actuation from positions 1 to positions 2 in response to clockwise rotation of the control lever 21, at the initiation of the exposure.

In operation of the shutter mechanism to initiate the exposure interval, for ambient exposure, a camera operator depresses the release lever 18, and the shutter driver 12 is released by the removal of projection 17 to thereby permit movement in the direction A to drive the opening blade 1 away from its aperture covering position, against the bias of the spring 6. Movement of the shutter driver 12 to engage the opening blade 1, releases the lever 21 which pivots about the pin 22 under the bias of the spring 24, as shown in FIG. 2. As the control lever 21 pivots, the cam follower 7 on extension 21b, moves along the cam surface 10, of the closing blade 2, unlocking the closing blade for movement to cover the aperture 5, when actuated at the end of the timed exposure interval. The pivoting motion of the control lever 21 also releases the latch 26 from finger 21c, which rotates under its bias into its latching position in which notch 33 latches the opening blade 1 (as shown in FIG. 2) in its open position during the timed exposure.

Figure 3:
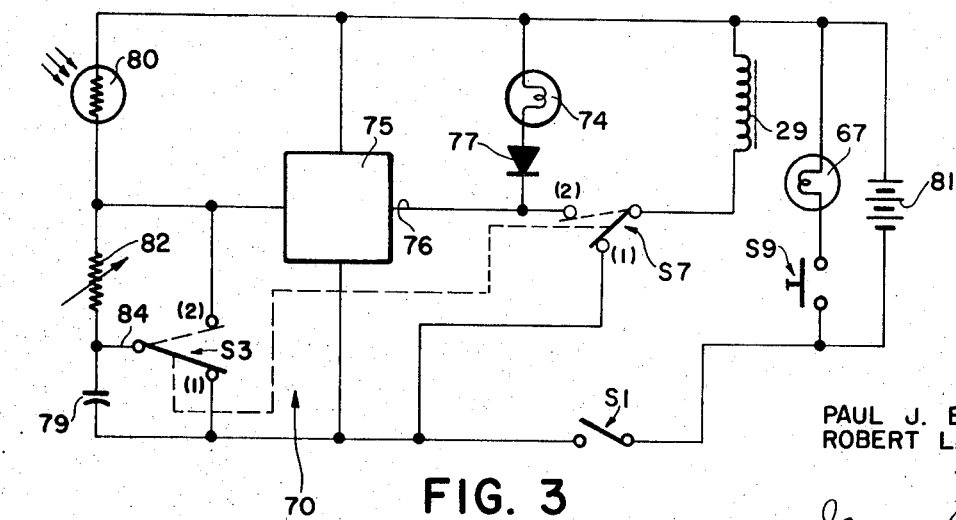
FIG. 3 is a schematic diagram of an electronic control circuit suitable for the shutter mechanism of FIGS. 1-3.

To terminate the exposure interval during ambient exposure, there is provided an electromagnet 29, the energization of which is controlled by a suitable circuit designated generally as 70, and such as shown in FIG. 3 and described below. When the electromagnet 29 is energized, it attracts an armature 30, pivotally mounted adjacent thereto, under the bias of a spring 31, into engagement with a detent 32 on the closing blade 2, to hold the closing blade 2 in its open position after the control lever 21 pivots, permitting the cam follower 7 to move along the cam surface 10, as shown in FIG. 2. The exposure interval is then terminated when the electromagnet 29 is deenergized to permit the bias of the spring 9, on the closing blade 2, to overcome the engagement of the detent 32 and the armature 30 so that the closing blade 2 is permitted to move under the bias of its spring 9 to cover the exposure aperture 5. When the closing blade 2 moves into its aperture covering position, a projection 36 on the closing blade 2 strikes an arm 37 extending from the latch 26, as shown in FIG. 2, pivoting the latch 26 counterclockwise to release the latch 26 from engagement with the opening blade 1, so that the opening blade 1 is returned to its covering position of FIG. 1, by influence of the spring 6. After the opening blade 1 returns to the position of FIG. 1, the closing blade 2 also covers the exposure aperture 5, however, as the shutter driver 12 is cocked, by conventional cocking mechanisms well known in the art, it engages the control lever 21, repositioning the control lever to the position of FIG. 1, which repositions the closing blade 2 to the position of FIG. 1 by the action of the cam follower 7 in engagement with the cam surface 10.

To control the termination of the exposure interval in ambient exposure, the circuit 70 is adapted to control energization and deenergization of the electromagnet 29, on a timed basis in accordance with scene illumination. The circuit 70 is energized during both ambient and artificially illuminated exposure as the initial travel of the release lever 18 closes the switch S1, connecting a battery 81 to the circuit 70. Closure of the switch S1 energizes the electromagnet 29 through a switch S7, normally in position 1, and supplies power to a dual purpose lamp 74, which acts as a low light indicator when the release lever 18 is slightly depressed (initial travel), and acts as an indicator of a timed exposure in progress when the release lever is fully depressed. Full depression of the release lever 18 releases the shutter driver 12 and permits the control lever 21 to pivot as the opening blade 1 opens. As the control lever 21 pivots, the bifurcated end 21d switches S3 and S7 from positions 1 to positions 2, thereby initiating the timing functions of the circuit 70, substantially in synchronization with the opening of the opening blade 1. When the switch S7 is actuated to position 2, deenergization of the electromagnet 29 is controlled by a trigger circuit 75, and the lamp 74, which is in parallel with the electromagnet, is energized indicating that a timed exposure is in progress. The circuit 70 also contains a photocell 80 coupled to a capacitor 79, which photocell 80 has a resistance value that varies inversely with the intensity of illumination on the photocell 80. As shown in FIG. 3, these components are series connected to function as a conventional "RC" integrating circuit that provides a voltage at a junction 84 which increases with time at a rate dependent upon the intensity of scene light incident on the photocell 80. The switch S3, which in the position 1 shunts the capacitor 79, when switched to position 2, connects the junction 84 to the input of the circuit 75. The trigger circuit 75 is adapted to switch from a conductive state to a nonconductive state when the input voltage at the junction 84 reaches a predetermined value. The circuit 75 as utilized in the present invention comprises a voltage-sensitive integrated circuit, having a single input at junction 84 and a single output at position 76. This circuit is not shown in detail, however, a Precision Threshold Detector such as Model PA 494 as manufactured by General Electric Company may be readily adapted to perform the low light indicator function and to energize electromagnet 29. When the switch S3 is actuated from position 1 to position 2, the capacitor 79 charges through the photocell 80 at a rate determined by the level of ambient light until the voltage at the junction 84 reaches a predetermined value, at which time the circuit 75 changes state and deenergizes the electromagnet 29, which releases the armature 30 from the closing blade 2, thereby permitting it to move to its aperture covering position to terminate the exposure interval, as shown in FIG. 2. As the circuit 75 deenergizes the electromagnet 29, current supply is also terminated to the lamp 74, and the lamp deenergizes, indicating termination of the automatically controlled exposure period. Thus, the exposure interval is initiated by actuation of the switch S3 substantially in synchronization with opening of the opening blade 1 and it is terminated by the closing blade 2 in response to operation of the circuit 75 after a period of time determined by the integrating circuit according to the illumination incident of the photocell 80. Therefore, the length of the exposure interval is determined by the integrating circuit as a function of the level of scene illumination incident on the photocell.

The electromagnet 29 requires a finite time to build up a flux field sufficient to attract the armature 30, and when initial control of the electromagnet is with the circuit 75, the spring 9 on the closing blade 2 may overcome the detent 32 before the electromagnet is up to the strength required to hold the closing blade 2 open. Therefore, the electromagnet 29 is energized fully through the switch S7 as the switch S1 is closed, and as the switch S7 is switched from position 1 to position 2, a make-before-break action of the switch S7 keeps the electromagnet 29 energized as control of deenergization of the electromagnet 29 is transferred to the circuit 75, as the exposure interval is initiated.

As discussed earlier, the circuit 75 is also adapted to control energization of the lamp 74 to perform a low light indicator function. The lamp 74 is coupled through diode 77 to the output of the circuit 75, and when the switch S1 is initially closed, the lamp 74 will energize depending upon the light incident on the photocell 80. If ambient scene light is low, the current supply through the photocell 80 to the circuit 75 will switch the circuit 75, supplying a ground for the lamp 74 which will cause the lamp 74 to energize, indicating that ambient scene light is too low for an exposure. Conversely, if the ambient scene light is high, the circuit output at 76 will not energize the lamp 74. In the event that the lamp 74 is energized, the operator has the option to continue to depress lever 18 and use the timed exposure, or insert a flash lamp unit into the camera recepticle.

Figure 4:
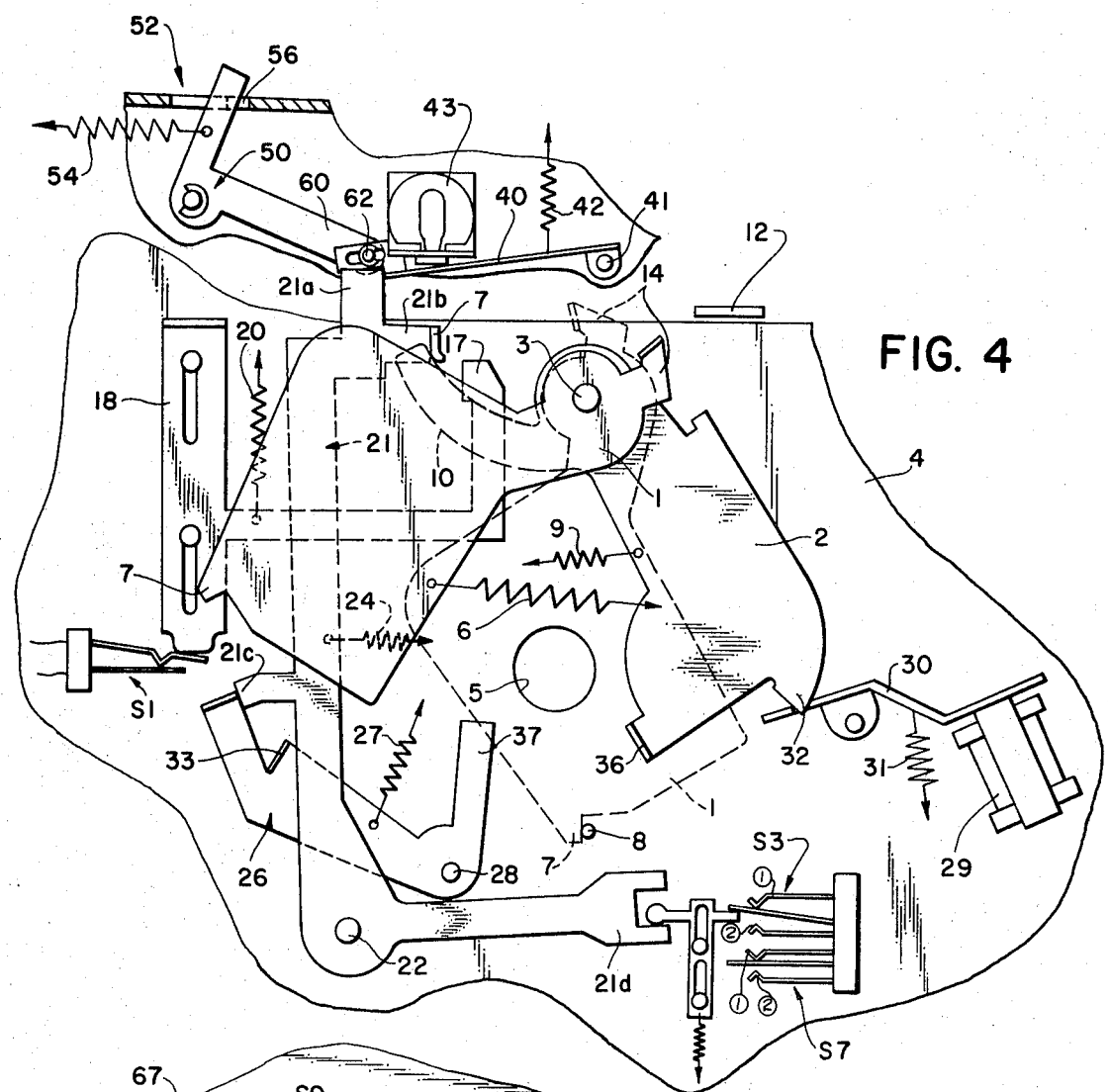
FIG. 4 is an elevational view of the shutter control mechanism of FIG. 1, shown during an exposure interval with a flashlamp unit and with the closed position of the opening blade shown in phantom.

For the purpose of providing the camera with a flash mode of operation, a flash unit lever 40 is provided, mounted on a pin 41 on support plate 4 and normally biased by a spring 42 to a position out of contact with the control lever 21, as shown by FIGS. 1 and 2. The lever 40 is positioned within the camera housing to sense the presence of a flashlamp unit 43 inserted into the camera as shown in FIG. 4. When the flashlamp unit 43 is inserted into the camera, the lever 40 is depressed to engage the control lever 21 at extension 21a, to prevent movement thereof during operation when a flashlamp unit 43 is inserted.

Acutation of the shutter mechanism in the flash mode of operation is initiated as in the electronically timed mode by depressing the release lever 18, which releases the shutter drive 12 from its captive position behind the projection 17 and allows it to move to engage and remove the opening blade 1 from the aperture covering position. However, as described earlier with respect to FIG. 4, in the flash mode of operation, when the lever 40 blocks rotation of the control member 21, the cam follower 7 does not follow along cam surface 10 to unlock the closing blade 2, and the latch member 26 does not rotate to locate the notch 33 in a position to lock the opening blade 1 in an aperture uncovering position. Therefore, the closing blade 2 is locked in an aperture unblocking position and under the action of the force of the spring 6, the opening blade 1 is returned to its original position as shown by the phantom lines of FIG. 4. The exposure time is set at approximately 1/40 second, but may be set to any flash exposure time required by proper selection of the tension in spring 6 and regulating the force of impact driver 12. Releasing pressure on the lever 18 results in an upward movement under bias of the spring 20, repositioning the projection 17 to a position to capture shutter driver 12 when the shutter is cocked.

Figure 5:
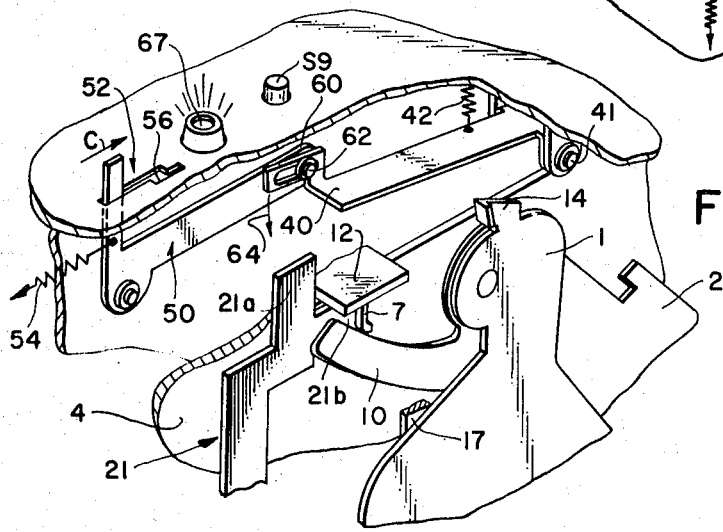
FIG. 5 is a fractional view showing an exterior control member operable to set the shutter apparatus at a fixed mechanical shutter speed.

As shown in FIG. 5, the lever 40 may be depressed to engage the control lever 21 by means of a control member 50 received in an irregular slot 52 on the camera housing, having a portion thereof exterior to the camera. The control member 50 is mounted for movement in the direction of arrow C against the bias of a spring 54, to a position where the control member 50 may be held by an offset portion 56 of the slot 52. One end 60 of the control member 50 has a pin 62 received in a slot 64 of an arm 65, which arm 64 engages lever 40. To use the control member 50 to set a fixed mechanical shutter speed in the camera, the control member 50 is depressed and moved against the bias of the spring 54 to a position where the control member 50 may be engaged behind the offset portion 56 of the slot 52. As the control member 50 is depressed and moved in the direction of arrow C, the pin 62 moves in the slot 64, depressing the lever 40 downward to engage the control lever 21.

A battery warning light 67 may be provided, place adjacent to the control member 50 on the camera housing, connected to a press-to-test type switch S9 in series therewith and paralleling the battery 81. Actuating the switch S9 to energize the warning light 67 will warn the operator if the battery is too low for timed or flash exposure in the event the electronic flash is required, giving the operator the option to depress the control member 50 and expose film at a fixed mechanical shutter speed.

Thus the apparatus shown may be operated in any one of three modes of operation depending upon the ambient scene light conditions. In situations where the scene is brightly illuminated, the apparatus operates to give a relatively short exposure interval dependent upon the ambient scene light. However, if the operator suspects that ambient scene light is insufficient, the release lever may be initially depressed, and if the ambient scene light is too low for exposure, the low light indicator comes on, giving the operator the option to insert a flashlamp unit. When the flashlamp unit is inserted, the camera operates at a fixed mechanical shutter speed. In the event that ambient scene light is sufficient for exposure, but the camera battery power is too low for timed or flash exposure, or there is no flashlamp unit available to insert into the camera to actuate the mechanical speed control, the control member exterior to the camera may be operated to activate the mechanical speed control.

The invention has been described in detail with particular reference to preferred embodiments thereof, but it will be understood that variations and modifications can be effected within the spirit and scope of the invention.

We claim:

1. In a camera adapted to expose film to object scene illumination through an exposure aperture, exposure control apparatus comprising:
   a. photosensitive means adapted to receive illumination from an object scene for varying an electrical parameter as a function of the level of scene illumination incident thereon;
   b. a first shutter blade movable from a first position covering the exposure aperture, to a second position uncovering the exposure aperture;
   c. means for actuating said first shutter blade to uncover the exposure aperture to initiate an exposure interval;
   d. return means for returning said first shutter blade to its first position to cover the exposure aperture a predetermined period of time after initiation of the exposure interval;
   e. latch means for engaging said first shutter blade when it uncovers the exposure aperture to prevent it from being returned by said return means to cover the exposure aperture, said latch means being actuatable to release said first shutter blade to cover the exposure aperture;
   f. control means actuatable to disable said latch means to permit the exposure time to be established by said return means;
   g. a second shutter blade movable from a first position uncovering the exposure aperture to a second position covering the aperture;
   h. means for controlling movement of said second shutter blade from the first to the second position;
   i. a voltage-sensitive trigger circuit coupled with said means for controlling movement of said second shutter blade and adapted to switch from a first state to a second state to actuate said means to release said second shutter blade for movement from its first to its second position when an input voltage reaches a predetermined level;
   j. activatable time-delay circuit means including said photosensitive means and connected with the input of said trigger circuit for producing a voltage at the trigger circuit input that changes from a first predetermined level when said circuit means is initially activated to said second predetermined level over a period of time that is a function of the level of illumination on said photoresponsive means; and
   k. means for activating said time-delay circuit means in a timed relation to the actuation of said first shutter blade to uncover the exposure aperture.

2. In a camera adapted to expose film to scene illumination through an exposure aperture, exposure control apparatus comprising:
   a. photosensitive means adapted to receive scene illumination from an object scene for providing a first signal indicative of scene illumination incident thereon;
   b. activatable, time-delay circuit means responsive to the first signal for producing a second control signal a period of time after activation thereof;
   c. a first shutter blade movable between an aperture covering position and an aperture uncovering position;
   d. actuatable means for moving said first shutter blade to its aperture uncovering position to initiate an exposure interval;
   e. first latch means for releasably retaining said first shutter blade when it is moved to its aperture uncovering position;
   f. a second shutter blade movable between an aperture uncovering position and an aperture covering position;
   g. second latch means for releasably retaining said second shutter blade in its aperture uncovering position;
   h. means responsive to the second control signal for effecting the release of said second shutter blade by said second latch means; and
   i. means for disabling said first latch means so that said first shutter blade will return to its closed position a predetermined period of time after initiation of an exposure interval.

3. In a camera adapted to expose film through an exposure aperture to ambient light conditions and to illumination derived from a photoflash device, said camera comprising:
   a. photoelectric circuit means for producing a control signal a period of time after actuation thereof;
   b. a first shutter blade movable from a first position covering the exposure aperture to a second position uncovering the exposure aperture;
   c. means for disposing said first shutter blade to its second position;
   d. means for actuating said circuit means to initiate an exposure interval;

e. a second shutter blade movable from a first position uncovering the aperture to a second position covering the aperture;
f. transducer means responsive to the control signal for actuating said second shutter blade to move from its first position to its second position to terminate the exposure interval; and
g. means for receiving a flashlamp device; the improvement comprising; h. sensing means for detecting the presence of a flashlamp device in said receiving means;
i. latch means for releasably latching said first shutter blade in its second position;
j. means for disabling said latch means when said sensing means detects the presence of a flashlamp device in said receiving means; and
k. means for returning said first shutter blade to cover the exposure aperture a predetermined period of time after initiation of an exposure interval when said latch means is disabled by said disabling means.

4. Apparatus as claimed in claim 3 wherein said disabling means comprises a first control member movable from a first position wherein it disables said latch means for latching said first shutter blade in its aperture uncovering position, said first control member movable to a second position wherein it enables said latch means to latch said first shutter blade in its aperture uncovering position.

5. Apparatus as claimed in claim 4 wherein said sensing means comprises a second control member for sensing the presence of a flashlamp device in said receiving means, said second control member movable from a first position to a second position in response to sensing the flashlamp device in said receiving means, said second control member in its second position disposing said first control member in its first position disabling said latch means.

6. Apparatus as claimed in claim 5, wherein said second control member is moved from its first position to its second position in response to actuation of means accessible from the exterior of the camera.

7. Apparatus as claimed in claim 6 wherein said accessible means comprises a manually operable member received in a slot in the camera, said manually operable member operable to dispose said second control member to its second position to thereby position said first control member to its first position.

8. Apparatus as claimed in claim 7 wherein there is further included means for testing the energy level of a camera energy source, said means comprising an indicator means and switch means coupled to the camera energy source, said switch accessible from the exterior of the camera and actuatable for energizing said indicator means.

9. In a camera having means defining an exposure aperture, an improved exposure control apparatus for providing an exposure interval related to scene illumination intensity, said apparatus comprising:
a first shutter blade movable from an exposure aperture blocking position to an exposure aperture unblocking position;
means for moving said first shutter blade to said aperture unblocking position;
means for urging said first shutter blade for movement from said exposure aperture unblocking position to said exposure aperture blocking position in a predetermined time interval;
first means for retaining said first shutter blade in said exposure aperture unblocking position;
a second shutter blade movable from an exposure aperture unblocking position to an exposure aperture blocking position;
second means for releasably retaining said second shutter blade in said exposure aperture unblocking position for a time interval related to scene illumination intensity;
means for moving said second shutter blade to said exposure aperture blocking position upon release by said second retaining means; and
means for disabling said first retaining means so that said urging means moves said first shutter blade to said exposure aperture blocking position after said predetermined time interval.

10. Exposure control apparatus as recited in claim 9 wherein said disabling means includes a control member which is operative in a first position for disabling said first retaining means and for retaining said second shutter blade in said aperture unblocking position after said second retaining means releases said second shutter blade.

11. Exposure control apparatus as recited in claim 10 further including means for moving said control member to a second position wherein said control member enables said first retaining means and releases said second shutter blade to permit said second shutter blade to move to said aperture blocking position upon release by said second retaining means.

12. In a camera having an exposure aperture, exposure control apparatus including a first shutter blade movable to an exposure aperture unblocking position, latch means for retaining the first shutter blade in the aperture unblocking position, a second shutter blade retained in an aperture unblocking position and movable to the aperture blocking position after a period of time established by photosensitive timing circuit means, and means for receiving a flash lamp unit, the improvement comprising:
means for sensing the presence of the flash lamp unit in the receiving means;
means responsive to said sensing of said flash lamp unit in said receiving means for disabling said latch means; and
means for moving said first shutter blade to the aperture blocking position a predetermined time after movement of the first shutter blade to aperture unblocking position.

13. In combination with a camera including means for receiving a potential source, an electronic circuit for controlling a time interval for a photographic exposure in relation to scene illumination intensity, comprising;
means for connecting a received potential source to said circuit;
photosensitive means exposed to scene illumination and having a parameter variable with the variations in the intensity of the scene illumination;
resistance means in series circuit with the said photosensitive means, said series combination being connectable across said potential source, said resistance means and photosensitive means defining a junction therebetween for providing a potential related to the value of said resistance means and said parameter of said photosensitive means;

trigger circuit means having an input and an output, said input being coupled to said junction, said trigger circuit means being activatable between a conductive and nonconductive state in accordance with the potential at said junction;

capacitive means connectable to said photosensitive means, said capacitive means being chargeable through said photosensitive means by said potential source;

first switch means actuatable for connecting said capacitor means to said input;

transducer means connectable to said trigger circuit output and energizable by said output when said trigger circuit is in said conducting state; and second switch means for providing an energizing path for said transducer means from said potential source upon activation of the electronic circuit, said second switch means actuatable for connecting said transducer to said output for transferring energizing control of said transducer to said trigger circuit means prior to the end of the time interval.

14. Exposure control apparatus as recited in claim 13 wherein said resistor means comprises a variable resistor.

15. Exposure control apparatus as recited in claim 14 including warning means coupled to said trigger circuit means and energizable depending upon the potential of said junction.

16. Exposure control apparatus as recited in claim 15 wherein said warning means is connectable in parallel with said transducer means and energizable when said transducer means is energized.

17. Exposure control apparatus as recited in claim 13, wherein said first and second switches are actuated substantially simultaneously.

18. In a camera including light responsive electronic circuit means for providing an exposure interval related to scene illumination intensity, the combination comprising:

a first shutter blade movable between an open and a closed condition;

means for retaining said first shutter blade in said open condition;

a second shutter blade releasably retained in an open condition by the circuit means during the exposure interval and movable to the closed condition to terminate an exposure at the end of the exposure interval; and means for disabling said retaining means and for maintaining said second shutter blade in said open condition so that said first shutter blade moves between said open and closed conditions to establish a preselected exposure interval.

* * * * *